July 23, 1957  W. F. WAGNER  2,800,540
DIRECTION SIGNAL

Filed April 15, 1953  2 Sheets-Sheet 1

INVENTOR
Willard F. Wagner
BY C. H. Sibbe
ATTORNEY

July 23, 1957 W. F. WAGNER 2,800,540
DIRECTION SIGNAL
Filed April 15, 1953 2 Sheets-Sheet 2
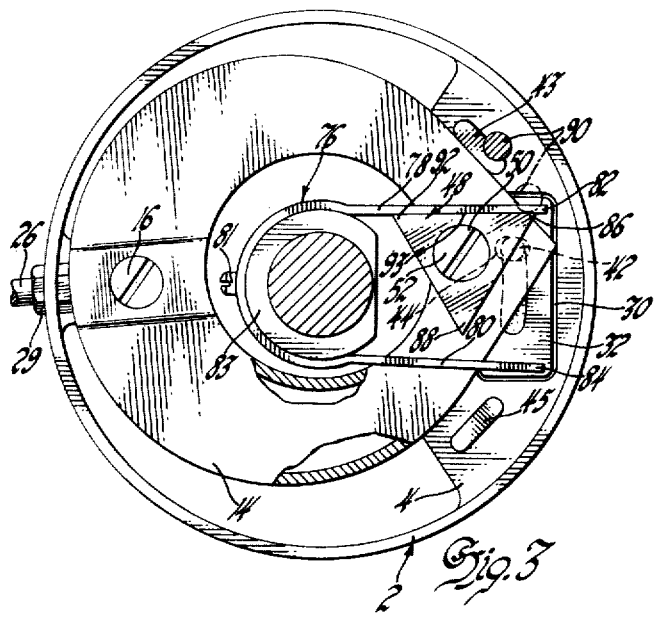
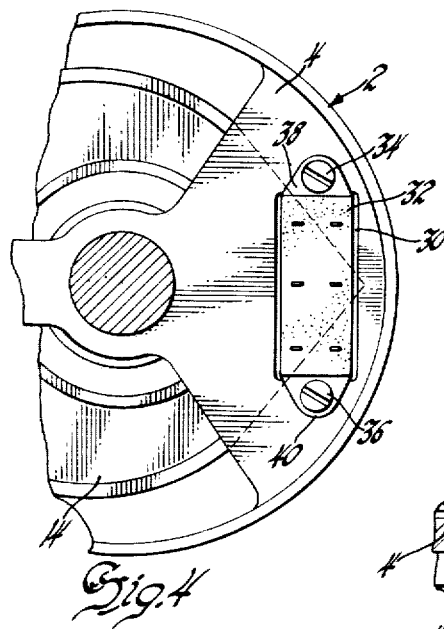
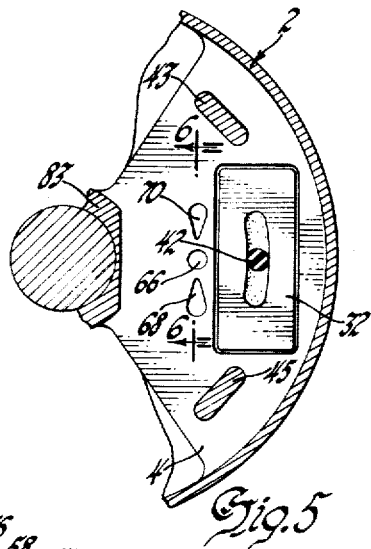
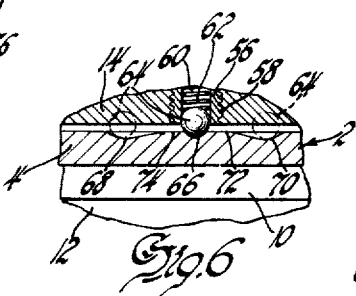
INVENTOR
Willard F. Wagner
BY C. F. Libbe
ATTORNEY United States Patent Office 2,800,540
Patented July 23, 1957

2,800,540

DIRECTION SIGNAL

Willard F. Wagner, Detroit, Mich., assignor to General Motors Corporation, Detroit, Mich., a corporation of Delaware Application April 15, 1953, Serial No. 349,037

8 Claims. (Cl. 200—61.34)

This invention relates to direction signal switch mechanisms and more particularly to manually set and automatically reset switch mechanisms adapted for disposition in concentric relation with the steering column of a vehicle.

An object of the present invention is to provide a direction signal switch mechanism which is manually settable to a right or left turn signaling position, wherein automatic means are provided for canceling the manually set positions in response to rotation of a steering wheel in a direction opposite that of the indicated turn.

Another object is to provide a direction signal switch mechanism of the type described comprising a concentrically disposed operating ring having a single pawl adapted to cancel either manual setting in response to rotation of the steering wheel in a direction opposed to the setting.

A further object is to provide a switch operating mechanism of the type described which may be manually restrained in either operating position while rotating the steering wheel in a direction opposite that of the indicated turn.

A still further object is to provide a switch operating mechanism of the type described wherein the angular velocity of the operating ring during canceling movement is substantially less than the angular velocity of the steering wheel.

Yet another object is to provide a switch mechanism of the type described wherein a single yieldable member centers the pawl when the mechanism is in the neutral, permits free rotation thereof in one direction and yieldably resists rotation thereof in the other direction when the mechanism is in the operating position.

A still further object is to provide a switch mechanism of the type described wherein the relationship of the pawl and yieldable member is such that the movement of the pawl during right turn canceling is reversely identical to the movement thereof during left turn canceling.

Still a further object is to provide a switch operating mechanism of the type described which is simple in construction, efficient in operation and low in cost.

These and other objects and advantages of the invention will become more fully apparent as reference is had to the accompanying drawings wherein:

Fig. 3 is a plan view similar to Fig. 1, showing the relationship of the parts when the mechanism is in an operating position.

Fig. 4 is a fragmentary view of a portion of Fig. 2 taken substantially along the line 4—4.

Figure 2:
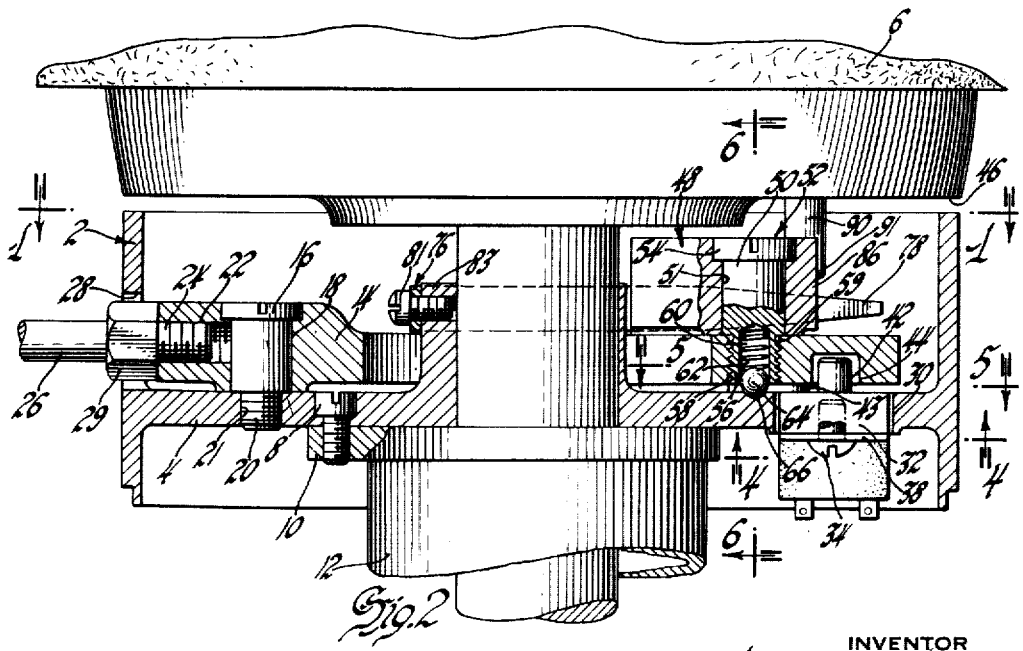
Fig. 2 is an enlarged side elevational view, partly in section, with parts broken away to more clearly illustrate the construction thereof.

Fig. 5 is a fragmentary plan view, partly in section, taken substantially along the line 5—5 of Fig. 2, and Fig. 6 is an enlarged fragmentary elevational view, partly in section, taken along the line 6—6 of Figs. 2 and 5.

Figure 1:
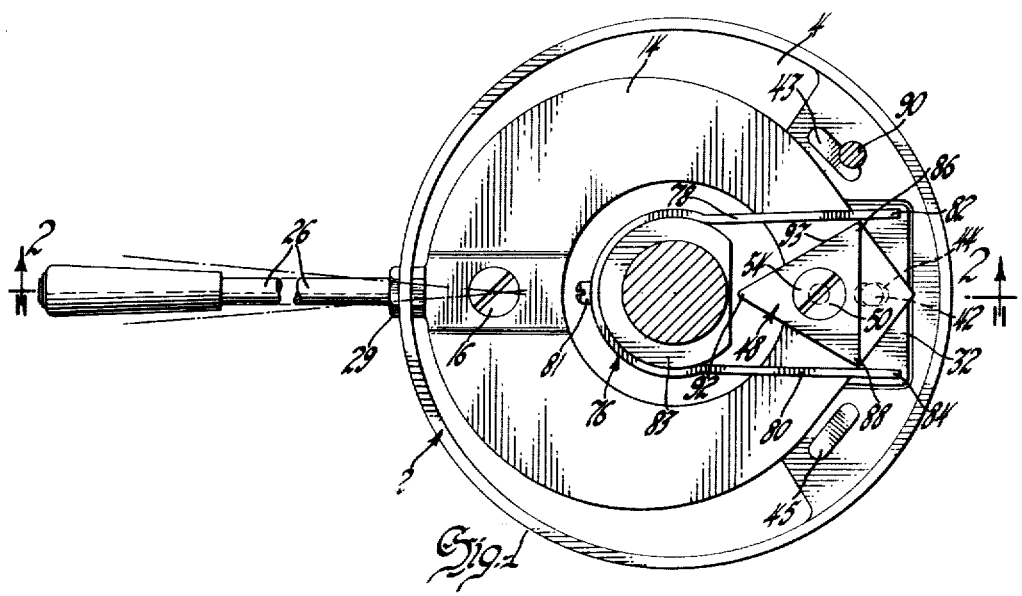
Fig. 1 is a plan view showing the construction and arrangement of the parts when the mechanism is in the neutral position.

Referring now to the drawings and particularly Figs. 1 and 2 there is illustrated a direction signal control mechanism wherein the reference numeral 2 designates a generally cylindrical housing or support having an integral web portion 4 spanning the interior centrally thereof. Housing 2 is adapted for disposition immediately below the steering wheel 6 in concentric relation therewith and is rigidly secured by means of a plurality of screws 8 to the flanged upper end 10 of the steering column 12.

Disposed within the housing 2, in substantially concentric relation with the steering column 12, is a generally circular operating member or ring 14. Operating ring 14 is pivotally supported at one side of the housing 2 on a first axis defined by a pivot stud 16. Stud 16 extends downwardly through an aperture 18 formed in the ring 14 and is provided with a threaded end portion 20 adapted for engagement with internally threaded aperture 21 formed in the web portion 4. Immediately adjacent aperture 18, ring 14 is provided with a radially outwardly extending threaded aperture 22 which is adapted to receive the threaded inner end 24 of a manual operating handle 26. Handle 26 extends outwardly through an elongated aperture 28 formed in the housing 2 radially adjacent threaded aperture 22 and is secured against loosening by lock nut 29. Diametrically opposite the pivot stud 16, web 4 is provided with a generally rectangular recess 30 in which is disposed an electrical switch 32. Switch 32 is threadably secured in the recess 30 by means of machine screws 34 and 36 which extend through tabs 38 and 40 and threadably engage the web 4. Switch 32 is of a conventional type having an upwardly projection operating pin 42 which is slidably movable to provide a central neutral position and circuit bridging positions at opposite sides of the neutral position. In order to operatively connect operating pin 42 with ring 14, the lower surface of ring 14 is provided with a radially elongated recess 44 into which the operating pin extends. It will be apparent that swinging movement of ring 14 from neutral to a position engaging stop 43 formed on the web 4 will move the switch operating pin 42 from the neutral position to a position energizing the right turn direction signal circuit while movement of the ring in the opposite direction from neutral position into engagement with stop 45 will move the operating pin 42 to a position energizing the left turn signal circuit. Ring 14 and switch operating pin 42 are yieldably retained in each of the above mentioned positions in a manner to be described later herein.

To accomplish automatic resetting of the switch operating mechanism from an operating position to the neutral position in response to rotation of the steering wheel 6, a radiate body in the form of a single pawl 48 of triangular configuration is mounted for rotatable movement about a second axis defined by the smooth midportion 50 of a threaded stud 52. Stud 52 projects upwardly from the ring 14 through a vertical bore 51 formed centrally in the pawl. At its upper end, stud 52 is formed with an enlarged head 54 adapted to retain the pawl 48 against axial movement. The threaded lower end portion 56 of stud 52 is adapted to threadably engage a threaded aperture 58 formed in ring 14 radially inwardly of recess 44. Upon tightening threaded portion 56 in aperture 58, the shoulder 59 of stud 52 is drawn into tight engagement with the upper surface of ring 14, rigidly securing the stud while assuring predetermined vertical clearance between the ring 14 and head 54 of the stud, thereby eliminating the possibility of binding of the pawl 48 by over-tightening the stud. To yieldably retain ring 14 and operating pin 42 in the neutral or either operating position, the threaded end portion 56 is provided with an internal bore 60 in which is disposed a coil spring 62 and ball 64. Directly below bore 60, the web 4 of the housing is provided with three arcuately arranged indentations 66, 68 and 70 which correspond to the neutral, right operating position and left operating position, respectively. When the ring 14 is in any of the adjusted positions, the lower half of ball 64 is yieldably seated in the corresponding indentation in the web 4, thereby yieldably restraining the ring 14 against swinging movement. Responsive to sufficient manual pressure on the ring 14, ball 64 rises vertically in the bore 60 against spring 62 to pass portions 72 or 74 of the web separating the indentations. It will be apparent that the detent action of the ball 64 may be increased or decreased by variations in the strength of the spring 62 or depth of the indentations 66, 68 and 70.

Pawl 48 is normally centered on the ring 14 in the position shown in Fig. 1 by a generally U-shaped spring 76 having slightly outwardly diverging blade portions 78 and 80. Spring 76 is secured by machine screw 81 to a struck-up pilot portion 83 formed integrally on the midportion of web 4. In its preferred form, spring 76 is adapted to provide progressively decreasing flexibility from each end 82 and 84 toward the anchor 81. As seen best in Fig. 1, when the ring 14 is in the neutral position, pawl 48 is free to rotate slightly in either direction. However, continued rotation of the pawl in either direction causes one of the corners 86 or 88 to engage blade 78 or 80 of spring 76. When triangular pawl 48 is in the neutral position shown, a depending cam or pin 90 secured to the base of the steering wheel 46 is free to rotate in an unobstructed circular path. It will be seen that lower end 91 of pin 90 is spaced vertically from the web 4 to clear spring blades 78 and 80. However, when the ring 14 is moved to a switch operating position, initial movement of the ring 14 causes corner 86 of pawl 48 to slidably engage blade 76. Upon continued swinging movement of ring 14, pawl 48 is rotated clockwise to bring one side 93 of the pawl into parallel alignment with blade 78, as shown in Fig. 3. When rotated to the position shown, the upper portion of corner 86 of the pawl is moved into the circular path of camming pin 90. Movement of pin 90, in either direction, must therefore rotatively displace pawl 48 sufficiently to move corner 86 out of the circular path followed by the pin. In this connection, it is to be noted that relatively slight rotation of the pawl 48 in a counterclockwise direction will permit the pin 90 to pass the corner 86 while relatively great clockwise rotation of the pawl is required to clear the path of the pin. In addition, rotation of the triangle pawl in a counterclockwise direction causes the corner 86 of the pawl to bear against the end 82 of the spring, where resistance to flexing is least, while clockwise rotation of the triangle causes the inner corner 92 of the triangle to bear against an intermediate portion of the spring. Since the resistance of the spring progressively increases toward the spring anchor 83, the intermediate portion of the spring will normally resist rotation of the pawl in a clockwise direction. Thus the end 82 of spring 76 will readily deflect to permit slight counterclockwise rotation of the triangular pawl and allow the pin 90 to clear the corner 86, but when the direction of rotation of the pin 90 is reversed, the resistance of the midportion of spring 76 is sufficient to provide, in effect, a fixed abutment engaging the corner 92 of the pawl. Therefore, as the pin 90 moves clockwise into engagement with the corner 86, rotating movement imparted to pawl 48 causes the ring 14 to move toward the neutral position. As the ring reaches the neutral position, pawl 48 will be rotated to a position placing the corner 86 in alignment with the studs 16 and 50. While the corner 86 at this point continues to obstruct the circular path of pin 90, negligible resistance is encountered during the remaining rotatable movement required to realign the triangle in the position shown in Fig. 1, since the axis of rotation of the triangle is then spaced equidistantly between the opposed blades 78 and 80 of the spring. It should be noted that each canceling operation causes indexing of the triangular element. Thus, if corner 86 is adjacent the outer end 82 of blade 78 before setting the signal for a left turn, corner 92 will be adjacent the said outer end of blade 78 after the canceling operation.

In order that the invention may be clearly understood, a description of the sequence of operation will be given. Assume that it is desired to make a left turn. The operator moves the operating handle 26 in a counterclockwise direction, thereby causing the ring 14 and switch operating pin 42 to move to the left turn signal operating position. Simultaneously, triangle 48 is rotated clockwise to place one edge thereof in alignment with the inner surface of blade 78. During movement of the mechanism to the left, the ball detent 64 rises upwardly from the central indentation 66 in web 4 against the action of the spring 62 to pass over the separating portion 72 and subsequently settle in the left detent depression 70 to resiliently retain the ring in the left turn signal operating position.

As the steering wheel 6 is rotated in a counterclockwise direction to effect the desired turn, downwardly depending canceling pin 90 successively engages the corner 86 of triangle 48, causing the triangle to rotate counterclockwise about the stud 50 to outwardly deflect the end 82 of spring blade 78 until sufficient clearance has been provided for the pin 90 to pass the said corner. Upon completion of the turn, the direction of steering wheel 6 is reversed to straighten the vehicle, causing pin 90 to engage the opposite side of corner 86. Initial clockwise rotation of pawl 48 about its pivot 50 causes corner 92 to apply progressively increasing pressure to the midportion of spring blade 78, until the pressure on spring blade 78 and the retaining pressure of the ball detent 64 reach a state of balance. Thereafter, continued pressure of the pin 90 on the pawl 48 is transmitted to the ring 14 by the camming action of the corner 92 against blade 78, causing the ring 14 to return to the neutral position. In connection with the canceling operation, it is also seen that should the mechanism become jammed or the operating lever 26 be forcibly held in the left turn signal operating position during reverse rotation of the steering wheel 6, the ring 14 will remain stationary. In this event, sufficient additional pressure will be applied to the midportion of the spring blade 78 by the corner 92 of the triangle 48 to cause the spring to deflect outwardly and permit rotative displacement in a clockwise direction of the corner 86 by pin 90. It will be seen, therefore, that the midportion of the spring, under normal conditions, resist rotation of the triangle, while deflecting outwardly when abnormal pressure is applied to the triangle by pin 90, thereby preventing damage to the mechanism. It is especially to be noted that because of the completely symmetrical relation of the parts in the invention, right turn signal canceling is accomplished by the single pawl 48 cooperating with blade 80 of spring 76 in a manner reversely identical to the description given for the left turn canceling operation. It will be seen because of the single pawl construction, duplication of parts is eliminated and assembly time considerably reduced.

In connection with the normal conceling operation of the mechanism, it will be observed that the angular travel of the pin 90 required to move the ring 14 from an operating position to a neutral position is approximately twice the angular distance traveled by the ring 14. Because of this disproportional ratio of movement, the momentum induced in the ring during the canceling operation is substantially reduced. In addition, as the ring reaches the neutral position, one of the corners 86 or 88 engages the opposing blade spring 78 or 80 to further dampen the momentum of the ring and prevent over travel of the neutral position.

While but a single embodiment of the invention has been shown and described, it will be apparent that other changes and modifications may be made therein. It is therefore not intended to limit the invention to the embodiment shown but only by the scope of the claims which follow.

I claim:

1. In a direction signal switch mechanism, a steering member, a depending cam carried by said steering member, a relatively shallow housing disposed in axial alignment with said steering member, a switch mounted in said housing, switch operating means pivotally mounted in said housing at one side thereof and selectively movable from a central neutral position to opposite switch closing positions, an equilateral three cornered pawl, means for pivotally mounting said pawl on said operating member, yieldable means associated with said last mentioned means for temporarily retaining said member in said selective positions, and resilient means cooperating with said pawl to normally center the same when said operating member is in neutral position, said means being adapted to rotatively position one corner of said pawl in the path of said depending cam in response to movement of said member in one direction and to rotatively position another corner of said pawl in the path of said depending cam in response to movement of said member in the opposite direction, said means being further adapted to engage said third corner of said pawl responsive to rotative movement of said pawl for returning said member to neutral from either switch closing position.

2. In a direction signal switch mechanism, a support, an operating member swingably mounted on said support, a rotatable cam, a spring, a pawl pivotally mounted on said operating member and adapted for rotary displacement by said cam, said pawl having three sides, and means securing said spring to said support, said spring being arranged to resiliently abut one of said sides of said pawl, whereby the former offers low resistance to rotary movement of said pawl in one direction and high resistance to rotary movement of said pawl in the opposite direction.

3. In a direction signal switch mechanism, a support, an operating member swingably mounted on said support for movement from a central neutral position to positions at either side of said neutral position, a spring having straight portions, means connecting said spring to said support, a rotary cam, a pawl pivotally mounted on said operating member and rotatively engageable by said cam, and means on said pawl engageable with said straight portions, said means comprising a plurality of substantially flat sides effective upon movement of said pawl in opposite directions to deffect said spring disproportionate amounts.

4. In a direction signal switch operating mechanism, a support, an operating member swingably mounted on said support, a rotatable cam, a pawl pivotally mounted on said operating member and a U-shaped spring having straight portions engageable with said pawl, said spring being anchored at its midportion, whereby said straight portions offer greater resistance to pivotal movement of said pawl in one direction than the other, said cam being effective to displace said pawl upon movement in one direction and to displace said operating member upon movement in the opposite direction.

5. In a direction signal switch operating mechanism, a support, an operating member swingably mounted on said support for movement from a neutral position to operating positions at opposite sides of said neutral position, detent means yieldably retaining said operating member in said positions, a rotatable cam, a pawl pivotally mounted on said operating member, and a blade spring having straight portions engageable with said pawl, said spring being anchored at its midportion causing said straight portions to offer greater resistance to pivotal movement of said pawl in one direction than the other, whereby said pawl is pivotally displaced in one direction responsive to movement of said cam in one direction and said operating member is normally displaced responsive to movement of said cam in the opposite direction, said pawl being pivotally displaceable in the opposite direction responsive to movement of said cam in said opposite direction when said operating member is forcibly restrained against movement.

6. A direction signal switch mechanism comprising, in combination, a support, an operating shiftably mounted thereon, a positive stop on said support limiting the shifting movement of the operating member, a triangular body pivotally mounted on the operating member for rotation about an axis transverse to the direction of movement of the operating member, a cam movable past and disposed to ride over the corner of said body and adapted to rotate the body from a predetermined position as the cam rides thereover, and yieldable abutment means mounted on the support resiliently engageable with a face of the body when the operating member engages the stop to bias the body toward the said predetermined position so that the body may rotate as the cam rides over the end thereof without shifting the operating member and so that the cam normally swings the body about the abutment means as a fulcrum at the other end of the lever to shift the operating member away from the stop.

7. A direction signal switch mechanism comprising, in combination, a support, an operating member rotatably mounted thereon for swingable movement about a first axis, means positively limiting swinging movement of the member, a triangular body mounted on the operating member for rotation thereon about a second axis remote from the first said axis, yieldable abutment means fixed to the support and disposed on opposite sides of said body so that rotation of the member from its neutral position causes a corner of the body to engage the resilient abutment means and rotate the body about the said first axis into a position with a side of the body generally radially disposed with respect to said first axis and in engagement with said abutment means whereby the abutment means impositively biases the body against rotation about the second axis, a rotary cam movable past the body and adapted to ride over the corner of the body by rotation of the body from its position in engagement with the abutment means when the operating member is restrained against rotation, the cam being adapted to return the operating member to neutral position by engaging the cam and swinging the same about the center determined by the engagement of the inner corner thereof with the abutment means.

8. A direction signal switch mechanism comprising, in combination, a support, an operating member shiftably mounted thereon, positive stops on said support limiting the shifting movement of the operating member, a triangular body pivotally mounted on the operating member for rotation about an axis transverse to the direction of movement of the operating member, a cam movable past and disposed to ride over the corner of said body and adapted to rotate the body from a predetermined position as the cam rides thereover, and yieldable abutment means comprising leaf spring means mounted on the support disposed at each side of the body resiliently engageable with the adjacent face of the body when the operating member engages the stop to bias the lever toward a said predetermined position so that the body may rotate as the cam rides over the end thereof without shifting the operating member and so that the cam normally swings the lever about the abutment means as a fulcrum at the other end of the lever to shift the operating member away from the stop engaged by the member.

(References on following page)

References Cited in the file of this patent

UNITED STATES PATENTS

| | | |
|---|---|---|
| 2,073,141 | Chaney | Mar. 9, 1937 |
| 2,249,137 | Hill | July 15, 1941 |
| 2,275,796 | Nacker et al. | Mar. 10, 1942 |
| 2,276,411 | Moore | Mar. 17, 1942 |
| 2,284,936 | Wilshusen | June 2, 1942 |
| 2,608,627 | Paule et al. | Aug. 26, 1952 |
| 2,611,842 | Lybrook et al. | Sept. 23, 1952 |
| 2,657,287 | Lincoln et al. | Oct. 27, 1953 |
| 2,678,358 | Thomson | May 11, 1954 |
| 2,690,483 | Elliott et al. | Sept. 28, 1954 |
| 2,691,704 | Lincoln et al. | Oct. 12, 1954 |
| 2,702,327 | Redick | Feb. 15, 1955 |
| 2,728,825 | Lincoln et al. | Dec. 27, 1955 |
| 2,731,525 | Redick | Jan. 17, 1956 |
| 2,733,309 | Elliott | Jan. 31, 1956 |

UNITED STATES PATENT OFFICE
CERTIFICATE OF CORRECTION

Patent No. 2,800,540                      July 23, 1957

Willard F. Wagner

It is hereby certified that error appears in the printed specification of the above numbered patent requiring correction and that the said Letters Patent should read as corrected below.

Column 5, line 54, for "deffect" read --deflect--; column 6, line 13, after "operating" insert --member--.

Signed and sealed this 22nd day of October 1957.

(SEAL)
Attest:
KARL H. AXLINE
Attesting Officer

ROBERT C. WATSON
Commissioner of Patents